US011600277B2

(12) United States Patent
Ueno

(10) Patent No.: US 11,600,277 B2
(45) Date of Patent: Mar. 7, 2023

(54) VOICE INPUT APPARATUS, CONTROL METHOD THEREOF, AND STORAGE MEDIUM FOR EXECUTING PROCESSING CORRESPONDING TO VOICE INSTRUCTION

(71) Applicant: CANON KABUSHIKI KAISHA, Tokyo (JP)

(72) Inventor: Daiyu Ueno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 172 days.

(21) Appl. No.: 17/160,809

(22) Filed: Jan. 28, 2021

(65) Prior Publication Data

US 2021/0241766 A1  Aug. 5, 2021

(30) Foreign Application Priority Data

Feb. 5, 2020  (JP) .............................. JP2020-018212

(51) Int. Cl.
| | |
|---|---|
| G10L 15/00 | (2013.01) |
| G10L 15/22 | (2006.01) |
| H04N 5/232 | (2006.01) |
| G10L 15/02 | (2006.01) |
| G10L 15/08 | (2006.01) |

(52) U.S. Cl.
CPC .............. G10L 15/22 (2013.01); G10L 15/02 (2013.01); H04N 5/23293 (2013.01); *G10L 15/08* (2013.01)

(58) Field of Classification Search
CPC combination set(s) only.
See application file for complete search history.

(56) References Cited

U.S. PATENT DOCUMENTS 9,201,511 B1 * 12/2015 Spurlock ................ G06F 3/0317
9,939,896 B2 *  4/2018 Teller ...................... G06F 3/013
(Continued)

FOREIGN PATENT DOCUMENTS

| CN | 105589555 A | 5/2016 |
|---|---|---|
| CN | 107643921 A | 1/2018 |

(Continued)

OTHER PUBLICATIONS

Office Action issued in U.S. Appl. No. 17/163,884 dated Jan. 26, 2022.

(Continued)

*Primary Examiner* — Vu B Hang
(74) *Attorney, Agent, or Firm* — Rossi, Kimms & McDowell LLP

(57) ABSTRACT

A voice input apparatus inputs voice and detects proximity to the voice input apparatus. The voice input apparatus performs control to, in a case where a second voice instruction for operating the voice input apparatus is input in a fixed period after a first voice instruction for enabling operations by voice on the voice input apparatus is input, execute processing corresponding to the second voice instruction. In a case where proximity to the voice input apparatus is detected, the voice input apparatus executes processing corresponding to the second voice instruction when the second voice instruction is input, even in a case where the first voice instruction is not input.

10 Claims, 5 Drawing Sheets

(56) References Cited

U.S. PATENT DOCUMENTS

| | | | |
|---|---|---|---|
| 10,228,904 B2 | 3/2019 | Raux | |
| 10,621,992 B2 | 4/2020 | Qian et al. | |
| 11,145,315 B2* | 10/2021 | Corsica | H04M 1/72454 |
| 2014/0214429 A1 | 7/2014 | Pantel | |
| 2015/0296294 A1 | 10/2015 | Paquier | |
| 2015/0331665 A1 | 11/2015 | Ishii | |
| 2018/0293221 A1 | 10/2018 | Finkelstein | |
| 2021/0243354 A1 | 8/2021 | Ueno | |

FOREIGN PATENT DOCUMENTS

| | | |
|---|---|---|
| CN | 109410952 A | 3/2019 |
| CN | 109584878 A | 4/2019 |
| CN | 110428806 A | 11/2019 |
| JP | H02131300 A | 5/1990 |
| JP | 2017054065 A | 3/2017 |
| JP | 2019086535 A | 6/2019 |

OTHER PUBLICATIONS

Extended European Search Report issued in European Appln. No. 21154514.0 dated Jun. 24, 2021.
Notice of Allowance issued in U.S. Appl. No. 17/163,884 dated May 13, 2022.

* cited by examiner

VOICE INPUT APPARATUS, CONTROL METHOD THEREOF, AND STORAGE MEDIUM FOR EXECUTING PROCESSING CORRESPONDING TO VOICE INSTRUCTION

BACKGROUND OF THE INVENTION

Field of the Invention

The present invention relates to a voice input apparatus, a control method thereof, and a storage medium for executing processing corresponding to a voice instruction.

Description of the Related Art

In recent years, apparatuses provided with a voice operation function that is able to recognize spoken voice inputs and perform operations corresponding to the voice inputs are known. For example, an operation for displaying desired pages for viewing, an operation for changing the current setting values of the apparatus, and an operation for calling a specific person or inputting the text of an e-mail message can be performed by the voice operation function using voice. While the voice operation function has the advantage of enabling operations to be performed with natural speech, the apparatus may also react to unintended voice, resulting in erroneous operations.

Japanese Patent Laid-Open No. 2019-86535 proposes a technology for reducing the occurrence of erroneous operations, by an apparatus capable of voice operations receiving a specific voice command called a wake word for enabling voice operations and receiving voice operations for only a predetermined period after the wake word. Also, Japanese Patent Laid-Open No. H2-131300 proposes a technology in which an apparatus that combines a proximity sensor with voice operations starts voice input reception when the proximity sensor reacts.

There is a problem with the technology proposed by Japanese Patent Laid-Open No. 2019-86535 in that the time and effort of always inputting the wake word is required in order to execute voice operations. When operating an image capture apparatus, there are times when a fast setting change is desired to avoid missing a photo opportunity. In the case of requiring the time and effort of always inputting the wake word, not only do operations simply become troublesome but there is a possibility of missing a desired photo opportunity when a voice operation is performed after giving the wake word.

Also, with the technology proposed by Japanese Patent Laid-Open No. H2-131300, there is a problem in that reception of voice inputs first starts in the case where the proximity sensor reacts, and thus voice operations cannot be performed if the distance is such that the proximity sensor does not react. That is, in cases such as shooting group photos from a position away from the image capture apparatus, for example, a user who wants to perform a voice operation (e.g., shooting instruction) needs to input voice after initially moving to a place where the proximity sensor will react.

SUMMARY OF THE INVENTION

The present disclosure has been made in consideration of the aforementioned issues, and realizes a technology that, in a voice input apparatus provided with a proximity sensor, is capable of realizing easy voice operations along with enabling quick operations when performing voice operations.

In order to solve the aforementioned problems, one aspect of the present disclosure provides a voice input apparatus comprising: a voice input device configured to input voice; an approach detection device configured to detect proximity to the voice input apparatus; one or more processors; and a memory storing instructions which, when the instructions are executed by the one or more processors, cause the voice input apparatus to function as: a control unit configured to perform control to, in a case where a second voice instruction for operating the voice input apparatus is input in a fixed period after a first voice instruction for enabling operations by voice on the voice input apparatus is input, execute processing corresponding to the second voice instruction, wherein the control unit, in a case where proximity to the voice input apparatus is detected by the approach detection device, executes processing corresponding to the second voice instruction when the second voice instruction is input, even in a case where the first voice instruction is not input.

Another aspect of the present disclosure provides, a control method of a voice input apparatus, the voice input apparatus comprising a voice input device configured to input voice and an approach detection device configured to detect proximity to the voice input apparatus, the control method comprising: performing control to, in a case where a second voice instruction for operating the voice input apparatus is input in a fixed period after a first voice instruction for enabling operations by voice on the voice input apparatus is input, execute processing corresponding to the second voice instruction, wherein, in the performing control, in a case where proximity to the voice input apparatus is detected by the approach detection device, processing corresponding to the second voice instruction is executed when the second voice instruction is input, even in a case where the first voice instruction is not input.

Still another aspect of the present disclosure provides, a non-transitory computer-readable storage medium comprising instructions for performing a control method of a voice input apparatus, the voice input apparatus comprising a voice input device configured to input voice and an approach detection device configured to detect proximity to the voice input apparatus, the control method comprising: performing control to, in a case where a second voice instruction for operating the voice input apparatus is input in a fixed period after a first voice instruction for enabling operations by voice on the voice input apparatus is input, execute processing corresponding to the second voice instruction, wherein, in the performing control, in a case where proximity to the voice input apparatus is detected by the approach detection device, processing corresponding to the second voice instruction is executed when the second voice instruction is input, even in a case where the first voice instruction is not input.

According to the present invention, in a voice input apparatus provided with a proximity sensor, it becomes possible to realize easy voice operations along with enabling quick operations when performing voice operations.

Further features of the present invention will become apparent from the following description of exemplary embodiments (with reference to the attached drawings).

DESCRIPTION OF THE EMBODIMENTS

Figure 1A:
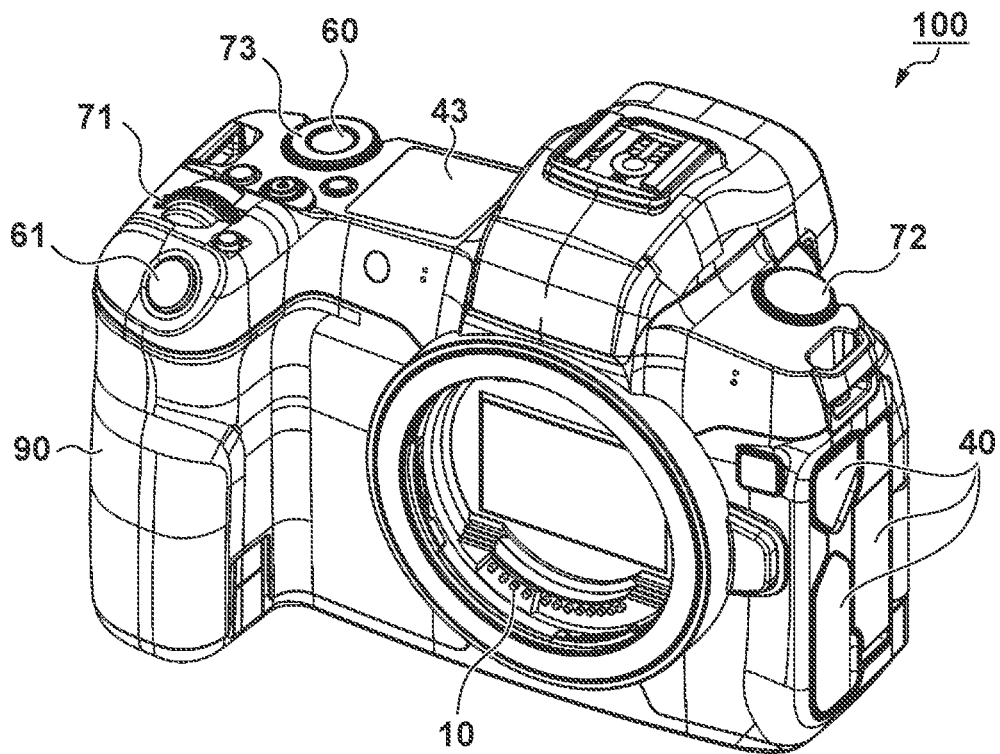
FIGS. 1A and 1B are diagrams showing an external appearance of a digital camera serving as an example of a voice input apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hereinafter, an example using a digital camera capable of operations using voice recognition as an example of a voice input apparatus will be described. However, the present embodiment is applicable not only to digital cameras but also to other devices capable of operations using voice recognition. These devices may include smartphones, personal computers, game machines, tablet terminals, music players, VR or AR headsets and medical equipment, for example.

Configuration of Digital Camera

Figure 1B:
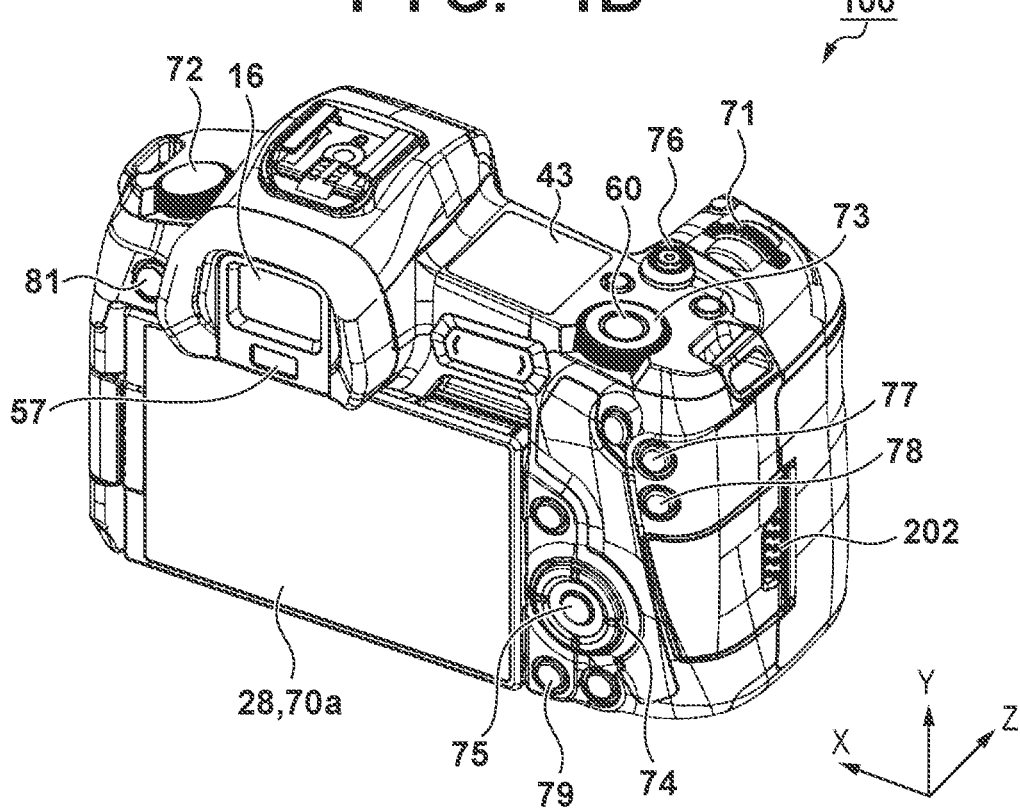

FIG. 1A and FIG. 1B show an external view of a digital camera 100 serving as an example of a voice input apparatus according to the present embodiment. FIG. 1A is a front perspective view of the digital camera 100, and FIG. 1B is a back perspective view of the digital camera 100. A display unit 28 is a display unit that is provided on a camera back surface and displays images and a variety of information. A touch panel 70a is able to detect touch operations on the display surface (operation surface) of the display unit 28. A viewfinder external display unit 43 is a display unit provided on a camera upper surface, and various setting values of the camera including shutter speed and aperture are displayed. A shutter release 61 is an operation unit for giving a shooting instruction. A mode changeover switch 60 is an operation unit for switching between various modes. A terminal cover 40 is a cover that protects a connector (not shown) for connecting a connecting cable of an external device to the digital camera 100.

A main electronic dial 71 is a rotary operation member that is included in an operation unit 70, and processing such as changing shutter speed, aperture and other setting values is possible, by turning this main electronic dial 71. A power switch 72 is an operation member that switches ON and OFF power of the digital camera 100. A sub-electronic dial 73 is a rotary operation member that is included in the operation unit 70, and is able to move the selected frame, perform image jump and the like. A cross key 74 is an operation member that is included in the operation unit 70, and has a press button capable of being pressed in four directions. Operations that depend on the direction in which the cross key 74 is pressed are possible. A SET button 75 is a press button that is included in the operation unit 70 and is mainly used for setting selected items and the like. A moving image button 76 is used for instructing start and stop of moving image shooting (recording). A voice input button 77 is a button that is able to restrict operation by voice to be enabled only when this button is being pressed. In the following description, however, the case where setting values that enable voice to be input irrespective of whether or not the voice input button 77 is being pressed are set, and various types of processing operate in response to voice operations will be illustrated to an example. A zoom button 78 is an operation button that is included in the operation unit 70 and is for switching ON and OFF a zoom mode in live view display of a shooting mode. Enlargement and reduction of live view images can be performed, by operating the main electronic dial 71 after setting the zoom mode to ON. In a playback mode, the zoom button 78 functions as a zoom button for enlarging the playback image and increasing the magnification ratio. A play button 79 is an operation button that is included in the operation unit 70 and is for switching between the shooting mode and the playback mode. By pressing the play button 79 during the shooting mode, the mode can be transitioned to the playback mode, and the latest image among the images recorded on a recording medium 200 can be displayed on the display unit 28. A menu button 81 is included in the operation unit 70, and by being pressed, a menu screen that is variously settable is displayed on the display unit 28. The user is able to configure various settings using the menu screen displayed on the display unit 28 and the cross key 74 and SET button 75.

A communication terminal 10 is a communication terminal for the digital camera 100 to communicate with a lens unit 150 (detachable) described later. An eyepiece unit 16 is an eyepiece unit of an eyepiece viewfinder (viewfinder that the user looks into), and video displayed on an internal EVF (Electronic Viewfinder) 29 is visible to the user through the eyepiece unit 16. An eye approach detection unit 57 is an eye approach detection sensor that detects whether the image taker's eye has approached the eyepiece unit 16.

A cover 202 is the cover of a slot that houses the recording medium 200. A grip part 90 is a holding part that is shaped to be easy to grip with the right hand when the user is holding the digital camera 100 ready to shoot. The shutter release 61 and the main electronic dial 71 are disposed in positions that are operable with the index finger of the right hand, in a state where the digital camera 100 is held with the little finger, ring finger and middle finger of the right hand around the grip part 90. Also, the sub-electronic dial 73 is disposed in a position operable with the thumb of the right hand in the same state.

Figure 2:
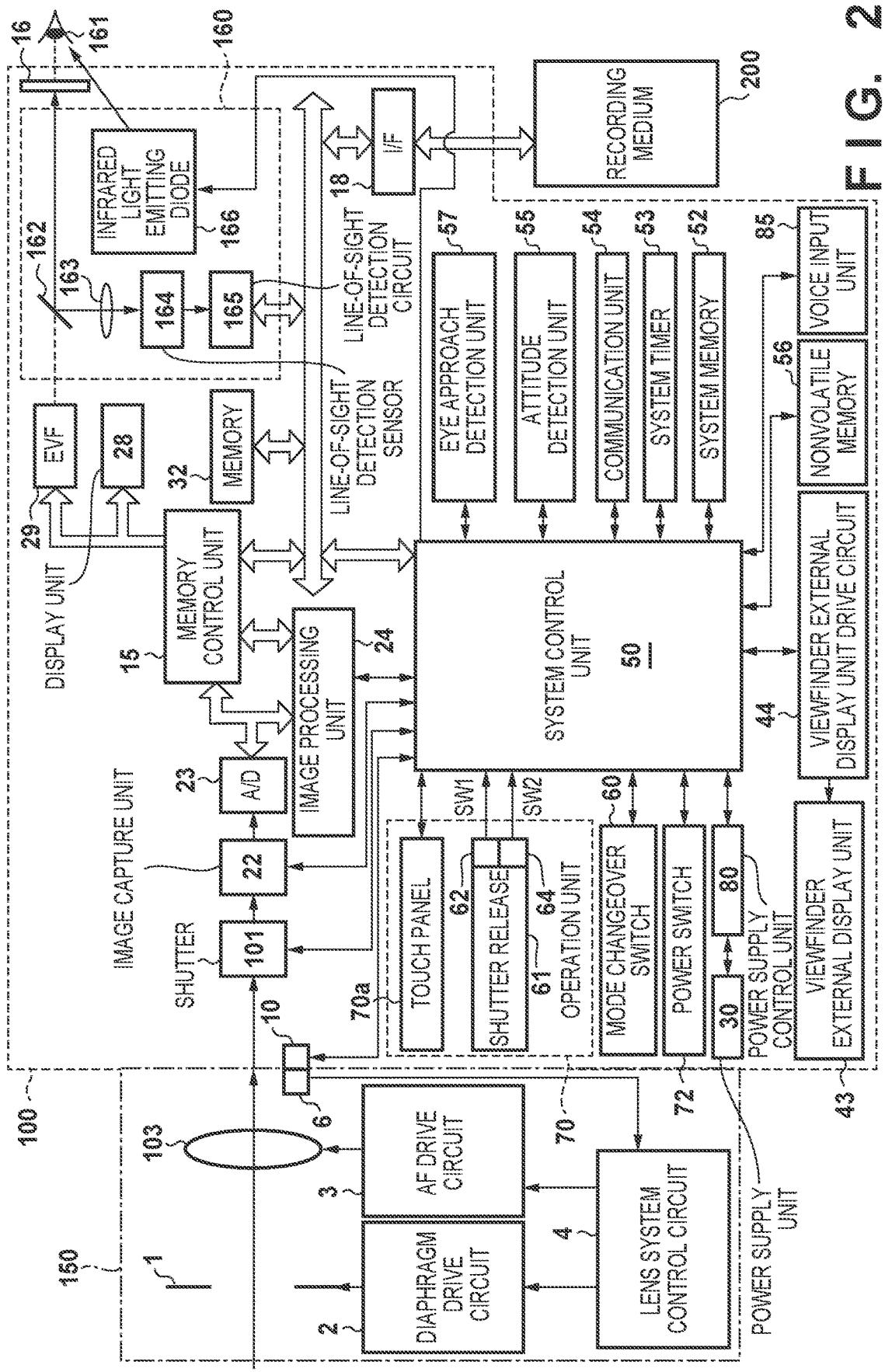
FIG. 2 is a block diagram showing an example functional configuration of the digital camera according to the present embodiment.

Next, an example functional configuration of the digital camera 100 according to the present embodiment will be described, with reference to FIG. 2. In FIG. 2, the lens unit 150 is a lens unit that is provided with an interchangeable shooting lens. The lens 103 is normally constituted by a plurality of lenses, but is simplified here, with only one lens being shown. A communication terminal 6 is a communication terminal for the lens unit 150 to communicate with the digital camera 100. The lens unit 150 communicates with a system control unit 50 via this communication terminal 6 and the aforementioned communication terminal 10, and controls a diaphragm 1 via a diaphragm drive circuit 2 with an internal lens system control circuit 4. Focusing is performed thereafter by displacing the lens 103, via an AF drive circuit 3.

A shutter 101 is a focal-plane shutter that is able to freely control the exposure time of an image capture unit 22 by the control of the system control unit 50.

The image capture unit 22 is an image sensor that is constituted by a CCD or CMOS device or the like that converts optical images into electrical signals. An A/D converter 23 is used in order to convert analog signals that are output by the image capture unit 22 into digital signals.

An image processing unit 24 performs color conversion processing and predetermined resize processing such as pixel interpolation and reduction on data from the A/D converter 23 or data from a memory control unit 15 described later. Also, the image processing unit 24 performs predetermined computational processing using captured image data. The system control unit 50 performs exposure control and ranging control based on the computation result obtained by the image processing unit 24. TTL (through the lens) AF (autofocus) processing, AE (auto exposure) processing, and EF (electronic flash) processing are thereby performed. The image processing unit 24 further performs predetermined computational processing using captured image data, and performs TTL AWB (auto white balance) processing based on the obtained computation result.

The memory control unit 15 controls data transmission and reception between the A/D converter 23, the image processing unit 24, and a memory 32. The output data from the A/D converter 23 is written to the memory 32 via the image processing unit 24 and the memory control unit 15 or directly via the memory control unit 15. The memory 32 stores image data obtained by the image capture unit 22 and converted into digital data by the A/D converter 23, and image data for displaying on the display unit 28 and the EVF 29. The memory 32 is provided with sufficient storage capacity to store a predetermined number of still images or moving images and audio of a predetermined time length.

Also, the memory 32 doubles as a memory for image display (video memory). Image data for display written to the memory 32 is displayed by the display unit 28 or the EVF 29 via the memory control unit 15. The display unit 28 and the EVF 29 perform display that depends on the signal from the memory control unit 15 on a display device such as an LCD or organic electroluminescent display. Live view display (LV display) can be performed by sequentially transferring data A/D converted by the A/D converter 23 and stored in the memory 32 to the display unit 28 or the EVF 29 and displaying the data. Hereinafter, images that are displayed in live view will be called live view images (LV images).

An infrared light emitting diode 166 is a light emitting element for detecting a line-of-sight position of the user on the viewfinder screen, and irradiates an eyeball (eye) 161 of the user whose eye has approached the eyepiece unit 16 with infrared light. The infrared light emitted by the infrared light emitting diode 166 is reflected by the eyeball (eye) 161, and this infrared reflected light reaches a dichroic mirror 162. The dichroic mirror 162 reflects only infrared light and transmits visible light. The infrared reflected light whose light path has been changed forms an image on an image capture surface of a line-of-sight detection sensor 164 via an image forming lens 163. The image forming lens 163 is an optical member constituting a line-of-sight detection optical system. The line-of-sight detection sensor 164 is constituted by an image device such as a CCD image sensor.

The line-of-sight detection sensor 164 photoelectrically converts incident infrared reflected light into electrical signals and outputs the electrical signals to a line-of-sight detection circuit 165. The line-of-sight detection circuit 165 includes at least one processor, and detects the line-of-sight position of the user from an image or movement of the user's eyeball (eye) 161, based on the output signal of the line-of-sight detection sensor 164, and outputs detection information to the system control unit 50. In this way, a line-of-sight detection block 160 is constituted by the dichroic mirror 162, the image forming lens 163, the line-of-sight detection sensor 164, the infrared light emitting diode 166, and the line-of-sight detection circuit 165. The line-of-sight detection block 160 detects the line of sight with a so-called corneal reflection method, for example. The corneal reflection method is a method that involves detecting the orientation and position of the line of sight from the positional relationship between the pupil of the eyeball (eye) 161 and reflected light that occurs due to the infrared light emitted by the infrared light emitting diode 166 being reflected particularly by the cornea of the eyeball (eye) 161. There are various other methods of detecting the orientation and position of the line of sight such as a so-called scleral reflection method that utilizes the difference in light reflectance between the iris and the white of the eye. Note that the line-of-sight detection unit may use any other method besides the above that can detect the orientation and position of the line of sight.

Various setting values of the digital cameras 100 including shutter speed and aperture are displayed on the viewfinder external display unit 43 via a viewfinder external display unit drive circuit 44.

A nonvolatile memory 56 is an electrically erasable/recordable memory, and a Flash ROM, for example, is used. Constants, programs and the like for use in operations of the system control unit 50 are stored in the nonvolatile memory 56. Programs as referred to here are computer programs for executing various flowcharts described later in the present embodiment.

The system control unit 50 includes one or more processors, for example, and controls the entire digital camera 100. Each processing of the present embodiment described later is realized, by programs recorded on the nonvolatile memory 56 being extracted to the system memory 52 and executed by the system control unit 50. A RAM, for example, is used for the system memory 52, and constants, variables, programs read out from the nonvolatile memory 56 and the like for use in operations of the system control unit 50 are extracted thereto. The system control unit 50 also performs display control by controlling the memory 32, the display unit 28 and the like.

A system timer 53 is a timing unit for measuring time that is used in various controls and the time of a built-in clock. The mode changeover switch 60, a first shutter switch 62, a second shutter switch 64 and the operation unit 70 are operation units for inputting various types of operating instructions to the system control unit 50. The mode changeover switch 60 switches the operating mode of the system control unit 50 to one of a still image shooting mode, a moving image shooting mode, and the like. Modes of the still image shooting mode include an auto shooting mode, an auto scene differentiation mode, a manual mode, an aperture priority mode (Av mode), a shutter speed priority mode (Tv mode), and a program AE mode (P mode). Also, there are various scene modes configured to shooting scene-specific shooting settings, a custom mode, and the like. Using the mode changeover switch 60, the user is able to directly switch to any of these modes. Alternatively, a configuration may be adopted in which after initially switching to a shooting mode list screen with the mode changeover switch 60, one of the plurality of displayed modes is selected, and switching is performed using another operation member. Similarly, the moving image shooting mode may also include a plurality of modes.

The first shutter switch 62 turns ON with a so-called half press (shooting preparation instruction) when the shutter release 61 provided in the digital camera 100 is partially operated, and generates a first shutter switch signal SW1. Shooting preparation operations such as AF (autofocus) processing, AE (auto exposure) processing, AWB (auto white balance) processing and EF (electronic flash) processing are started with the first shutter switch signal SW1.

The second shutter switch 64 turns ON with a so-called full press (shooting instruction) when the shutter release 61 is fully operated, and generates a second shutter switch signal SW2. The system control unit 50 starts the operations of a series of shooting processing from signal readout from the image capture unit 22 to writing of the captured image to the recording medium 200 as an image file, with the second shutter switch signal SW2.

The operation unit 70 is various types of operation members serving as input units that receive operations from the user. As described above, the operation unit 70 includes the shutter release 61, the touch panel 70a, the main electronic dial 71, the sub-electronic dial 73, the cross key 74, and the SET button 75. The operation unit 70 also includes the moving image button 76, the voice input button 77, the zoom button 78, the play button 79, and the menu button 81.

A power supply control unit 80 is constituted by a battery detection circuit, a DC-DC converter, a switch circuit for switching the block that is electrified, and the like, and detects whether a battery is mounted, the type of battery, and the remaining battery. Also, the power supply control unit 80 controls the DC-DC converter based on the detection results and instructions of the system control unit 50, and supplies a required voltage to various components including the recording medium 200 for a required period. A power supply unit 30 includes a primary battery such as an alkaline battery or a lithium battery, a secondary battery such as a NiCd battery, a NiMH battery or Li battery, and an AC adaptor.

A recording medium I/F 18 is an interface with the recording medium 200, which is a memory card, a hard disk or the like. The recording medium 200 is a recording medium such as a memory card for recording shot images, and is constituted by a semiconductor memory, a magnetic disk or the like.

A communication unit 54 includes a communication circuit or a communication module, for example, is connected wirelessly or by cable, and performs transmission and reception of video signals and audio signals. The communication unit 54 is also capable of connecting to wireless communication for mobile phones, a wireless LAN (Local Area Network), and the Internet. Also, the communication unit 54 is capable of communicating with external devices even with Bluetooth (registered trademark) and Bluetooth (registered trademark) Low Energy. The communication unit 54 is capable of transmitting images (including live view images) captured by the image capture unit 22 and images recorded on the recording medium 200, and is able to receive images and various other information from external devices.

An attitude detection unit 55 detects the attitude of the digital camera 100 relative to the direction of gravity. An image shot with the image capture unit 22 can be differentiated as being an image shot with the digital camera 100 held horizontally or an image shot with the camera held vertically, based on the attitude detected by the attitude detection unit 55. It is possible for the system control unit 50 to add orientation information that depends on the attitude detected by the attitude detection unit 55 to the image file of an image captured by the image capture unit 22, and to rotate and record images. As for the attitude detection unit 55, an acceleration sensor, a gyroscope sensor or the like can be used. It is also possible to detect movement (pan, tilt, lift, whether stationary or not, etc.) of the digital camera 100, using the acceleration sensor, gyroscope sensor or the like serving as the attitude detection unit 55.

The eye approach detection unit 57 is an eye approach detection sensor that detects that the eye (object) 161 has moved closer to (approached) or has moved away (withdrawn) from the eyepiece unit 16 of the viewfinder (approach detection). The system control unit 50 switches between display (display state)/non-display (non-display state) of the display unit 28 and the EVF 29, according to the state detected by the eye approach detection unit 57. More specifically, at least in the case where the digital camera 100 is in a shooting standby state and the setting for switching the display destination of live view images captured by the image capture unit 22 is set to automatic switching, display is set to ON with the display unit 28 as the display destination and the EVF 29 is set to non-display, when the eye has not approached the eyepiece unit 16. Also, display is set to ON with the EVF 29 as the display destination and the display unit 28 is set to non-display, when the eye has approached the eyepiece unit 16. An infrared proximity sensor, for example, can be used for the eye approach detection unit 57, and the eye approach detection unit 57 is able to detect the approach of an object of some sort to the eyepiece unit 16 of the viewfinder that incorporates the EVF 29. In the case where an object has approached the eyepiece unit 16, infrared light projected from a projection unit (not shown) of the eye approach detection unit 57 is reflected and received by a light receiving unit (not shown) of the infrared proximity sensor. The eye approach detection unit 57 is also able to differentiate how close an object has approached to the eyepiece unit 16 (eye approach distance), depending on the amount of infrared light that is received. In this way, the eye approach detection unit 57 performs eye approach detection for detecting the proximity distance of an object to the eyepiece unit 16. Note that, in the present embodiment, the projection unit and light receiving unit of the eye approach detection unit 57 are separate devices to the aforementioned infrared light emitting diode 166 and line-of-sight detection sensor 164. The infrared light emitting diode 166 may, however, also serve as the projection unit of the eye approach detection unit 57. Furthermore, the line-of-sight detection sensor 164 may also serve as the light receiving unit. The case where an object that approaches within a predetermined distance to the eyepiece unit 16 is detected from a non-eye approached state (non-approached state) will be taken as detecting that the user's eye has approached the eyepiece unit 16. The case where an object whose approach was detected moves away by the predetermined distance or more from an eye approached state (approached state) will be taken as detecting that the user's eye has withdrawn from the eyepiece unit 16. The threshold for detecting the approach of the user's eye and the threshold for detecting the withdrawal of the user's eye may differ due to providing hysteresis, for example. Also, from after it is detected that the user's eye has approached until when it is detected that the user's eye has withdrawn will be taken as the eye approached state. From after it is detected that the user's eye has withdrawn until when it is detected that the user's eye has approached will be taken as the non-eye approached state. Note that the infrared proximity sensor is given as an example, and any sensor that is able to detect the approach of an eye or an object that is viewed as the user's eye having approached the eyepiece unit 16 may be employed for the eye approach detection unit 57.

The system control unit 50 is able to detect the following operations or states based on the output from the line-of-sight detection block 160.

Line of sight of the user whose eye has approached the eyepiece unit 16 being newly input (detected). That is, the start of line-of-sight input.

State where there is line-of-sight input of the user whose eye has approached the eyepiece unit 16.

State where the user whose eye has approached the eyepiece unit 16 is gazing steadily.

Line of sight of the user whose eye has approached the eyepiece unit 16 having shifted. That is, the end of line-of-sight input.

State where there is no line-of-sight input of the user whose eye has approached the eyepiece unit 16.

The steady gaze described here refers to the case where the line-of-sight position of the user has not exceeded a predetermined amount of movement within a predetermined time.

The touch panel 70a and the display unit 28 can be integrally constituted. For example, the touch panel 70a is constituted such that the transmissivity of light does not interfere with display on the display unit 28, and is attached to the upper layer of the display surface of the display unit 28. Input coordinates of the touch panel 70a are associated with display coordinates on the display screen of the display unit 28. GUIs (graphical user interfaces) that appear as though the user is directly operating the screen displayed on the display unit 28 can thereby be provided. The system control unit 50 is able to detect the following operations on the touch panel 70a or states of the touch panel 70a.

Finger or pen that was not touching the touch panel 70a newly touching the touch panel 70a. That is, the start of touching (hereinafter, referred to as a touch-down).

State where a finger or pen is touching the touch panel 70a (hereinafter, referred to as a touch-on).

Finger or pen moving while touching the touch panel 70a (hereinafter, referred to as a touch-move).

Finger or pen that was touching the touch panel 70a being lifted. That is, the end of touching (hereinafter, referred to as a touch-up).

State where nothing is touching the touch panel 70a (hereinafter, referred to as a touch-off).

A touch-on is also simultaneously detected when a touch-down is detected. A touch-on is normally continuously detected after a touch-down, as long as a touch-up is not detected. A touch-move is also detected in a state where a touch-on is being detected. Even when a touch-on is being detected, a touch-move is not detected unless the touch position moves. A touch-off is after a touch-up of all fingers and pens that were touching has been detected.

These operations and states and the position coordinates where a finger or pen is touching the touch panel 70a are notified to the system control unit 50 through an internal bus. The system control unit 50 determines what kind of operation (touch operation) was performed on the touch panel 70a based on the notified information. With regard to a touch-move, the movement direction of the finger or pen that moves on the touch panel 70a can also be determined for every vertical component and horizontal component on the touch panel 70a, based on the change in the position coordinates. The case where a touch-move being performed for a predetermined distance or more is detected will be taken as determining that a slide operation has been performed. An operation that involves quickly moving only a certain distance with a finger touching the touch panel and then directly lifting the finger is called a flick. A flick is, in other words, an operation that involves quickly tracing over the touch panel 70a as if flicking the touch panel 70a with a finger. When a touch-move being performed for a predetermined distance or more at a predetermined speed or more is detected, followed directly by a touch-up being detected, it can be determined that a flick was performed (it can be determined that there was a flick following a slide operation). Furthermore, a touch operation that involves a plurality of places (e.g., two points) being touched simultaneously and the touch positions being moved closer together is called a pinch-in, and a touch operation that involves the plurality of touch positions being moved further apart is called a pinch-out. The pinch-out and the pinch-in are collectively referred to as a pinch operation (or simply a pinch). Any of touch panels employing various methods may be used for the touch panel 70a, such as a resistive touch panel, a capacitive touch panel, a surface acoustic wave touch panel, an infrared touch panel, an electromagnetic induction touch panel, an image recognition touch panel, and an optical sensor touch panel. Depending on the method, contact with the touch panel is detected as a touch or a finger or pen approaching the touch panel is detected as a touch, and either method may be used.

A voice input unit 85 includes an unillustrated microphone, and performs processing for acquiring ambient sounds around the digital camera and voice instructions from the user described later. Also, the present invention is applicable not only to the digital camera itself but also to a control device that communicates with the digital camera (including a network camera) via wired or wireless communication and remotely controls the digital camera. As for devices that control a digital camera remotely, there are devices such as smartphones, tablet PCs and desktop PCs, for example. The digital camera is controllable from a remote location, by notifying commands that cause the digital camera to perform various operations and configure various settings from the control device side, based on operations performed on the control device side and processing performed on the control device side. Also, a configuration may be adopted in which live view images shot with the digital camera can be received via wired or wireless communication and displayed on the control device side.

Series of Operations of Main Processing

Figure 3A:
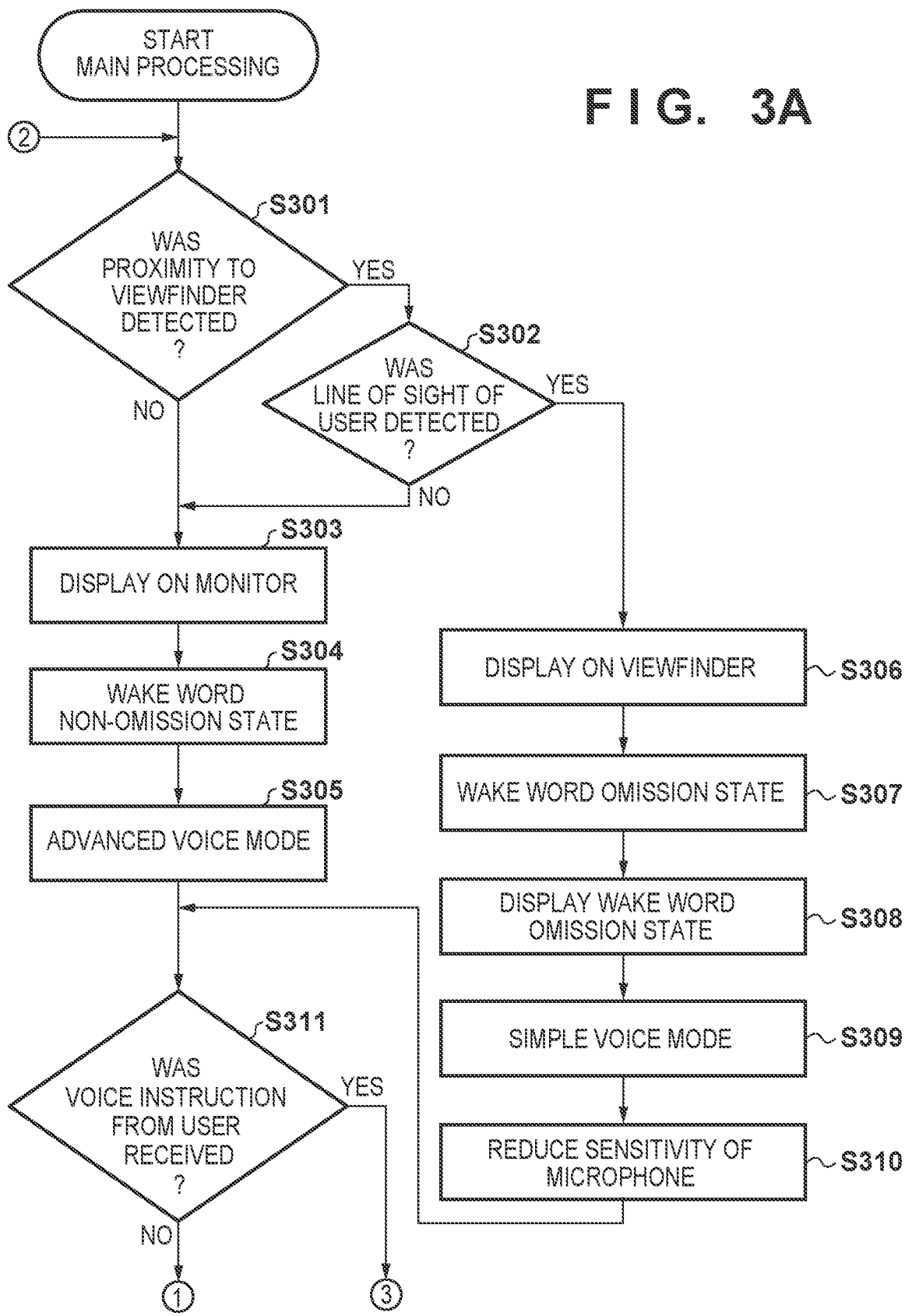
FIGS. 3A and 3B are flowcharts showing series of operations of main processing according to the present embodiment.
Figure 3B:
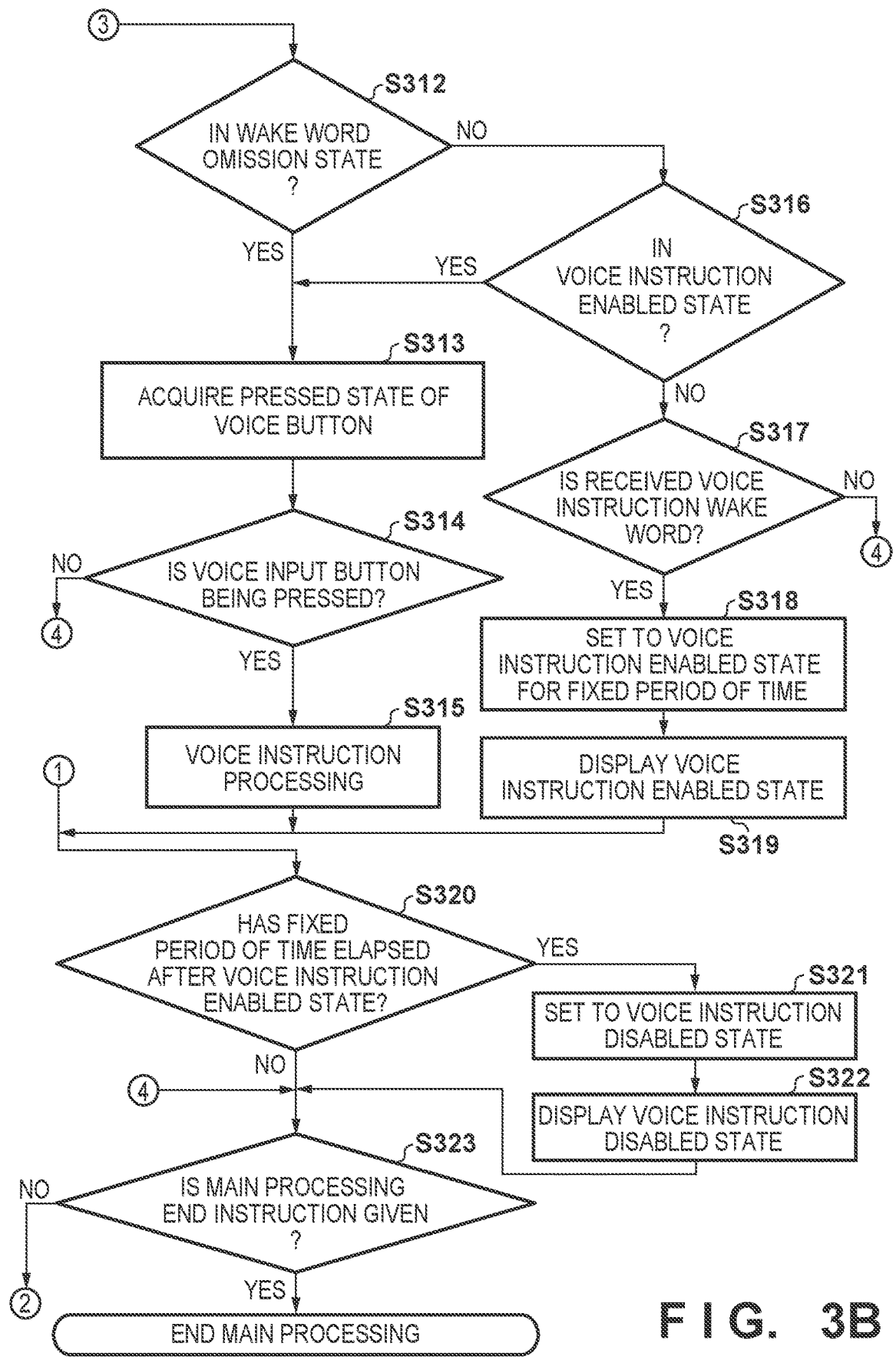

Next, the main processing according to the present embodiment will be described with reference to FIGS. 3A and 3B. Operations of the main processing are operations from detection of proximity to the viewfinder incorporating the EVF 29 to completion of the voice operation. Note that each processing of the main processing is realized by programs stored in the nonvolatile memory 56 being extracted to the system memory 52 and executed by the system control unit 50. Also, the wake word is a specific voice instruction for enabling operations by voice on the digital camera 100.

In step S301, the system control unit 50 determines whether proximity to the viewfinder incorporating the EVF 29 was detected. The system control unit 50 advances to step S302 if it is determined that proximity of an object to the viewfinder incorporating the EVF 29 was detected, and advances to step S303 if it is determined that proximity to the viewfinder was not detected, based on a signal from the eye approach detection unit 57, for example.

In step S302, the system control unit 50 determines whether the line of sight of the user was detected by the line-of-sight detection block 160. The system control unit 50 advances to step S306 if it is determined that the line of sight of the user was detected, and advances to step S303 if it is determined that the line of sight of the user was not detected, based on a signal from the line-of-sight detection block 160.

In step S303, the system control unit 50 switches the display output destination of image information to the display unit 28. Note that the system control unit 50 may execute processing for turning on the display unit 28 (i.e., controlling the ON-state of the display unit 28), rather than switching the display output destination to the display unit 28. If such a configuration is adopted, information on the monitor can be checked simply by the user taking his or her eye away, when shooting while looking into an optical viewfinder that does not incorporate the EVF 29.

In step S304, the system control unit 50 changes the state of the digital camera 100 to the wake word non-omission state, and stores the state information of the digital camera in the memory 32 (may be stored in the system memory 52; this similarly applies hereinafter). The system control unit 50 determines whether the digital camera 100 is in the wake word omission state, based on state information of the digital camera 100. As described below, generally, the digital camera 100 enters a voice instruction enabled state, in the case where the input voice instruction is the wake word, and performs processing corresponding to voice instructions received thereafter. However, in the wake word omission state, the digital camera 100 is able to execute processing corresponding to voice instructions, due to the voice instruction that is first received, without receiving the wake word (i.e., by omitting reception of the wake word). In other words, by providing the wake word omission state, quick operations become possible when performing voice operations.

Also, the wake word non-omission state is a state in which voice operations cannot be performed by voice instruction until after the user inputs the wake word. The wake word non-omission state has a sub-state of the voice instruction enabled state in which voice operations are enabled after receiving the wake word and the voice instruction disabled state in which voice operations are disabled due to not receiving the wake word.

In step S305, the system control unit 50 changes the state of the digital camera 100 to an advanced voice mode, and stores the state information of the digital camera 100 in the memory 32. The advanced voice mode is an operating mode for processing voice whose processing time is long, such as utilizing a voice processing engine supporting a wide variety of voice instructions or performing voice processing on a high-precision cloud server.

In step S306 (when the line of sight of the user is detected in step S302), the system control unit 50 switches the display output destination of image information to display on the viewfinder incorporating the EVF 29. Note that the system control unit 50 may execute processing for turning off the monitor screen rather than switching to viewfinder display. This has the effect of being able to resolve the problem of the illuminated display unit 28 being glary when shooting while looking into the optical viewfinder that does not incorporate the EVF 29.

Figure 4A:
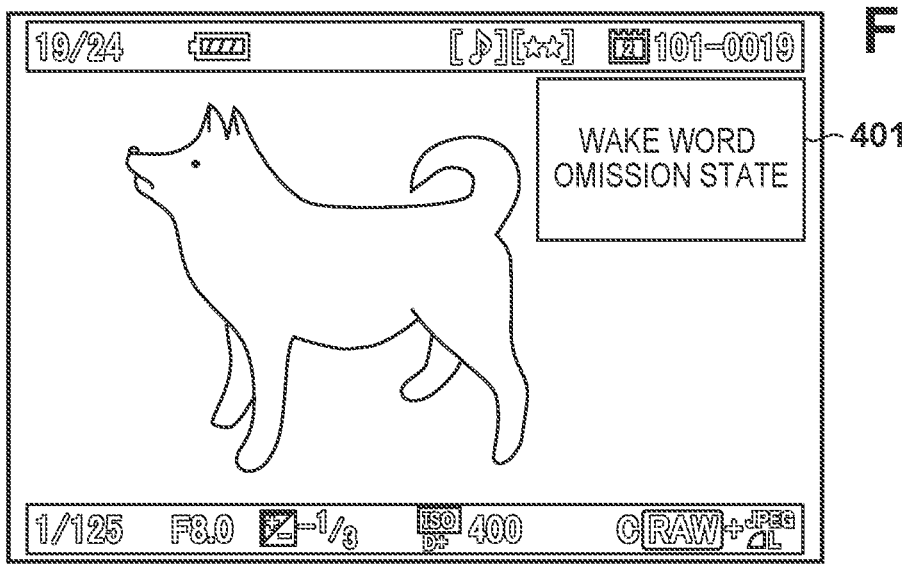
FIGS. 4A to 4C are diagrams showing an example of a photo playback screen in the present embodiment.

In step S307, the system control unit 50 changes the state of the digital camera 100 to the wake word omission state, and stores the state information of the digital camera 100 in the memory 32. In step S308, the system control unit 50 displays a screen indicating that the digital camera is in the wake word omission state on the viewfinder that incorporates the EVF 29. For example, FIG. 4A shows an example of a voice operable screen indicating that the digital camera is in the wake word omission state, and a guidance 401 is guidance indicating the wake word omission state. Note that, in this example, the case where guidance is displayed as an example display indicating the wake word omission state is illustrated as an example, but an icon may be displayed.

In this way, the system control unit 50 performs display control so as to perform, on the viewfinder, display indicating that the digital camera 100 is in a state of executing, when a voice instruction is input, processing corresponding to the voice instruction, even in a case where the wake word is not input.

In step S309, the system control unit 50 changes the state of the digital camera 100 to a simple voice mode, and stores the state information of the digital camera 100 in the memory 32. The simple voice mode is an operating mode for processing voice whose processing time is short, such as utilizing a voice processing engine supporting a limited variety of voice instructions or performing voice processing within a low-precision device compared to a cloud.

In step S310, the system control unit 50 reduces the sensitivity of the microphone constituting the voice input unit 85 (to less than the sensitivity in a state where the user is not in proximity). In this operation, even though voice generally become harder to pick up due to lowering the sensitivity of the microphone, in the state of this step, the user is looking into the viewfinder and is thus in proximity to the digital camera 100 itself. Thus, even if the sensitivity of the microphone is lowered, inputting voice instructions of the user is unlikely to be an issue. On the other hand, erroneous operations due to unintended voice issued by persons other than the user can be reduced by lowering the sensitivity of the microphone. In this way, in the main processing according to the present embodiment, the display output destination is switched between monitor display and viewfinder display, according to whether proximity to the digital camera 100 is detected by approach detection with respect to the viewfinder.

In step S311, the system control unit 50 determines whether a voice instruction from the user was received by the voice input unit 85. The system control unit 50 advances to step S312 if it is determined that a voice instruction from the user was received by the voice input unit 85 based on a signal from the voice input unit 85, and advances to step S320 if it is determined that a voice instruction from the user has not been received.

In step S312, the system control unit 50 determines whether the digital camera 100 is in the wake word omission state. The system control unit 50 determines whether the digital camera 100 is in the wake word omission state, based on the state information of the digital camera 100 that is stored in the memory 32, for example. The system control unit 50 advances to step S313 if it is determined that the state of the digital camera 100 is the wake word omission state, and advances to step S316 if it is determined that the state of the digital camera 100 is not the wake word omission state.

In step S313, the system control unit 50 acquires the pressed state of the voice input button 77, and stores the state information of the digital camera 100 in the memory 32. In step S314, the system control unit 50 determines whether the voice input button 77 is in a state of being pressed, based on the state information of the digital camera 100 that is stored in the memory 32. The voice input button 77 enables input of voice by the voice input unit 85. The system control unit 50 advances to step S315 if it is determined that the voice input button 77 is in a state of being pressed, and advances to step S323 if the voice input button 77 is not being pressed.

In step S315, the system control unit 50 executes voice instruction processing, in accordance with voice instructions input by the user. The voice instruction processing includes processing for performing shooting of still images and moving images in accordance with voice instructions from the user, for example. Alternatively, the voice instruction processing may include processing for displaying a screen for "confirming the setting value of shutter speed (Tv value) or aperture value (Av value)" corresponding to a voice instruction or "paging through help/guidance or photos" corresponding to a voice instruction in accordance with the voice instruction.

In step S316, the system control unit 50 determines whether operations by voice instruction are enabled (voice instruction enabled state). If it is determined that the state of the digital camera 100 is the voice instruction enabled state of the wake word non-omission state, based on the state information of the digital camera 100 that is stored in the memory 32, for example, the system control unit 50 advances to step S313. On the other hand, if the state of the digital camera 100 is not the voice instruction enabled state of the wake word non-omission state, the system control unit 50 advances to step S317.

In step S317, the system control unit 50 determines whether the received voice instruction is a wake word determined in advance. If it is determined that the received voice instruction is a wake word determined in advance (i.e., specific voice instruction for enabling voice operations) due, for instance, to the voice instruction matching the wake word, the system control unit 50 advances to step S318. On the other hand, if it is determined that the received voice instruction is not the wake word, the system control unit 50 advances to step S323.

In step S318, the system control unit 50 sets the digital camera 100 to a state (i.e., voice instruction enabled state) in which operations by voice instruction are enabled, spanning a fixed period of time. At this time, the system control unit 50 stores this state in the state information of the digital camera 100 in the memory 32, and measures the duration of the voice instruction enabled state with a timer.

Figure 4B:
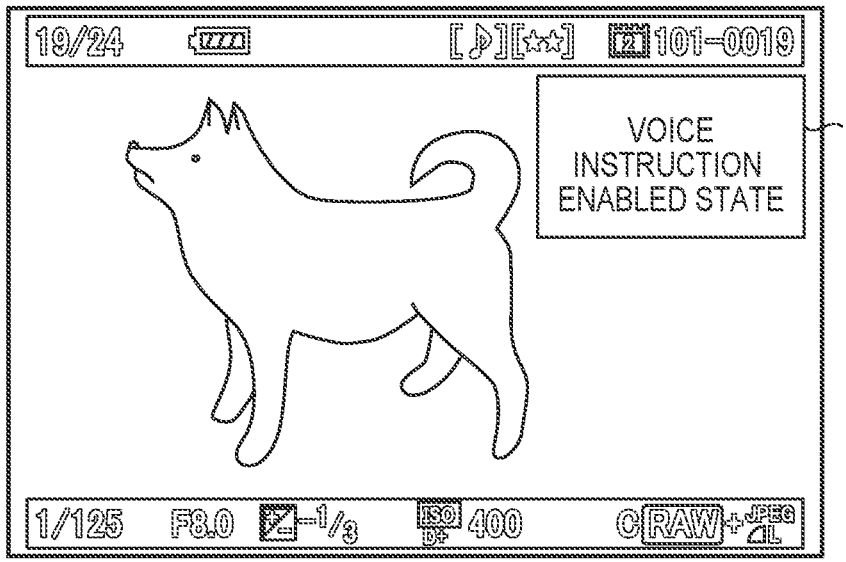

In step S319, the system control unit 50 displays a voice instruction enabled state screen shown in FIG. 4B, for example, on the display unit 28. In the example shown in FIG. 4B, a guidance 402 indicating that the state of the digital camera 100 is the voice instruction enabled state is displayed on a voice operable screen. Note that, in the example shown in FIG. 4B, the case where guidance is displayed is illustrated as an example, but a similar state may be indicated with a predetermined icon.

In step S320, the system control unit 50 determines whether a fixed period of time has elapsed after the state of the digital camera 100 changed to the voice instruction enabled state. The system control unit 50 advances to step S321 if it is determined that the fixed period of time has elapsed after changing to the voice instruction enabled state, and advances to step S323 if it is determined that the fixed period of time has not elapsed after changing to the voice instruction enabled state, based on time measured by the timer.

Figure 4C:
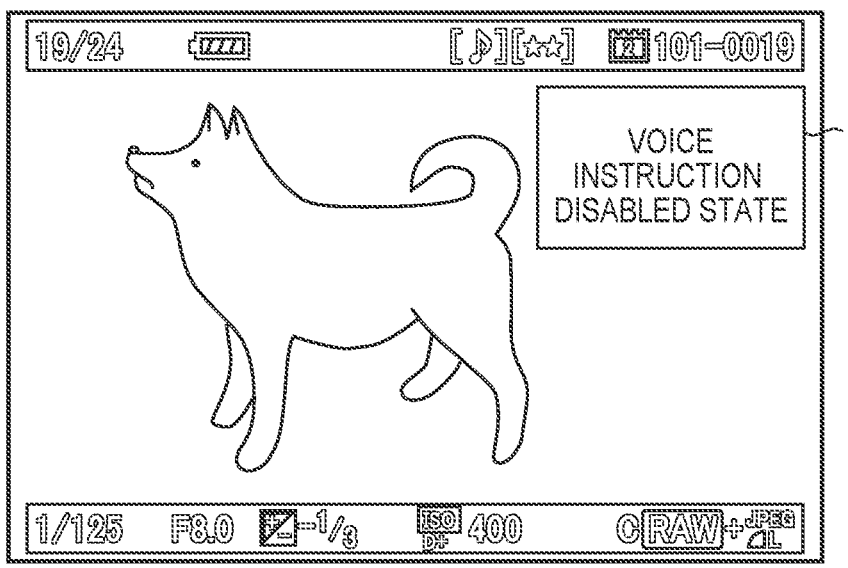

In step S321, the system control unit 50 sets the state of the digital camera 100 to a state in which operations by voice instruction are disabled (voice instruction disabled state), and stores this state in the state information of the digital camera 100 in the memory 32. In step S322, the system control unit 50 displays a voice instruction disabled state screen shown in FIG. 4C, for example, on the display unit 28. In the example shown in FIG. 4C, a guidance 403 indicating that the state of the digital camera 100 is the voice instruction disabled state is displayed on a voice operable screen. Note that, in the example shown in FIG. 4C, the case where guidance is shown is illustrated as an example, but a similar state may be indicated with a predetermined icon.

In this way, in the case where a voice instruction is received during the fixed period of time after changing the state of the digital camera 100 to the voice instruction enabled state, the system control unit 50 executes processing corresponding to the voice instruction. On the other hand, in the case where a voice instruction is not received during the fixed period of time after changing the state of the digital camera 100 to the voice instruction enabled state, the system control unit 50 returns the state of the digital camera 100 to the voice instruction disabled state again and does not process voice instructions so as to avoid erroneous operations based on voice instructions.

In step S323, the system control unit 50 determines whether a main processing end instruction such as the power switch 72 being powered OFF has been given. The system control unit 50 ends the main processing if it is determined that a main processing end instruction has been given, and returns the processing to step S301 if it is determined that a main processing end instruction has not been given. Note that, in the case where an anomalous operation such as turning the mode dial during the abovementioned operations is performed, the system control unit 50 may interrupt the series of operations of the main processing being performed.

As described above, according to the present invention, voice operations are started by conveying the wake word, in the case where the proximity sensor has not detected proximity (of the user) to the digital camera. Thus, since the user is able to perform operations at a distance even without being in proximity to the digital camera 100, easy voice operations can be realized. On the other hand, by omitting the wake word in the case where the proximity sensor detects proximity to the digital camera, voice operations can be started immediately, and it is possible to enable quick operations when performing voice operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-018212, filed Feb. 5, 2020 which is hereby incorporated by reference herein in its entirety.

What is claimed is:

1. A voice input apparatus comprising:
  a voice input device configured to input voice;
  an approach detection device configured to detect proximity to the voice input apparatus;
  an image capture device configured to shoot images;
  one or more processors; and
  a memory configured to store instructions which, when executed by the one or more processors, cause the one or more processors to function as:
    a control unit configured to perform control to:
      in a case where a second voice instruction for operating the voice input apparatus is input in a fixed period after a first voice instruction for enabling operations by voice on the voice input apparatus is input, execute processing corresponding to the second voice instruction; and
      in a case where proximity to the voice input apparatus is detected by the approach detection device, execute processing corresponding to the second voice instruction when the second voice instruction is input, even in a case where the first voice instruction is not input; and a display control unit configured to display, on a first display device or a second display device, information on an image that is shot by the image capture device, wherein the display control unit is configured to switch a display output destination of the image information between the first display device and the second display device based on whether proximity to the voice input apparatus is detected by the approach detection device.

2. The voice input apparatus according to claim 1,
wherein the instructions, when executed by the one or more processors, further cause the one or more processors to function as an enabling unit configured to enable input of voice by the voice input device, and
wherein the control unit is further configured to execute processing corresponding to the second voice instruction in a case where input of voice is enabled by the enabling unit.

3. The voice input apparatus according to claim 1, wherein the display control unit is further configured to perform, on the first display device, display indicating that the voice input apparatus is in a first state of executing processing corresponding to the second voice instruction when the second voice instruction is input, in a case where the first voice instruction is not input.

4. The voice input apparatus according to claim 3,
wherein the display control unit is further configured to perform, on the second display device, display indicating that the voice input apparatus is in a second state that is not the first state.

5. The voice input apparatus according to claim 1,
wherein the display control unit is further configured to turn on the first display device that displays image information, and
wherein the display control unit is further configured to switch an ON-state of the first display device according to whether proximity to the voice input apparatus is detected by the approach detection device.

6. The voice input apparatus according to claim 1,
wherein the control unit is further configured to reduce, in a case where proximity to the voice input apparatus is detected by the approach detection device, a sensitivity of the voice input device to less than in a case where proximity to the voice input apparatus is not detected.

7. The voice input apparatus according to claim 1,
wherein the control unit is further configured to set operating modes whose processing times on input voice differ, according to whether proximity to the voice input apparatus is detected by the approach detection device.

8. The voice input apparatus according to claim 1, further comprising:
a line-of-sight detection device configured to detect a line of sight of a user,
wherein the control unit is further configured to execute, in a case where the line of sight of the user is detected by the line-of-sight detection device and proximity to the voice input apparatus is detected by the approach detection device, processing corresponding to the second voice instruction when the second voice instruction is input, even in a case where the first voice instruction is not input.

9. A control method of a voice input apparatus, the voice input apparatus comprising a voice input device configured to input voice, an approach detection device configured to detect proximity to the voice input apparatus, and an image capture device configured to shoot images, the control method comprising:
performing control to, in a case where a second voice instruction for operating the voice input apparatus is input in a fixed period after a first voice instruction for enabling operations by voice on the voice input apparatus is input, execute processing corresponding to the second voice instruction;
performing control to, in a case where proximity to the voice input apparatus is detected by the approach detection device, execute processing corresponding to the second voice instruction when the second voice instruction is input, even in a case where the first voice instruction is not input;
displaying, on a first display device or a second display device, information on an image that is shot by the image capture device; and
switching a display output destination of the image information between the first display device and the second display device based on whether proximity to the voice input apparatus is detected by the approach detection device.

10. A non-transitory computer-readable storage medium comprising instructions for performing a control method of a voice input apparatus, the voice input apparatus comprising a voice input device configured to input voice, an approach detection device configured to detect proximity to the voice input apparatus, and an image capture device configured to shoot images, the control method comprising:
performing control to, in a case where a second voice instruction for operating the voice input apparatus is input in a fixed period after a first voice instruction for enabling operations by voice on the voice input apparatus is input, execute processing corresponding to the second voice instruction;
performing control to, in a case where proximity to the voice input apparatus is detected by the approach detection device, execute processing corresponding to the second voice instruction when the second voice instruction is input, even in a case where the first voice instruction is not input;
displaying, on a first display device or a second display device, information on an image that is shot by the image capture device; and
switching a display output destination of the image information between the first display device and the second display device based on whether proximity to the voice input apparatus is detected by the approach detection device.

* * * * *